US006691687B1

(12) United States Patent
Liang et al.

(10) Patent No.: US 6,691,687 B1
(45) Date of Patent: Feb. 17, 2004

(54) CRANKCASE BLOW-BY FILTRATION SYSTEM

(75) Inventors: Cho Y. Liang, West Lafayette, IN (US); Steven R. McCoy, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/325,094

(22) Filed: Dec. 19, 2002

(51) Int. Cl.[7] .............................................. F02M 25/02
(52) U.S. Cl. ..................... 123/572; 123/41.86; 123/573
(58) Field of Search ................. 123/573, 574, 123/41.86

(56) References Cited

U.S. PATENT DOCUMENTS

| | | | |
|---|---|---|---|
| 3,358,661 A | | 12/1967 | Garner |
| 3,641,768 A | | 2/1972 | Cornelius |
| 3,779,221 A | * | 12/1973 | Gartner ...................... 123/572 |
| 4,011,846 A | * | 3/1977 | Gagliardi ..................... 123/572 |
| 4,184,858 A | | 1/1980 | Walker |
| 4,768,493 A | * | 9/1988 | Ohtaka et al. .............. 123/573 |
| 4,881,511 A | | 11/1989 | Pickering ..................... 123/572 |
| 4,969,329 A | | 11/1990 | Bolton et al. |
| 5,024,203 A | * | 6/1991 | Hill ............................. 123/573 |
| 5,205,265 A | | 4/1993 | Kashiyama et al. |
| 5,331,940 A | | 7/1994 | Takayama |
| 5,456,239 A | | 10/1995 | Henderson et al. |
| 5,611,204 A | | 3/1997 | Radovanovic et al. |
| 5,722,376 A | | 3/1998 | Sweeten ...................... 123/574 |
| 5,803,025 A | | 9/1998 | Feucht ...................... 123/41.86 |
| 5,878,731 A | * | 3/1999 | Bedlowski ................... 123/572 |
| 5,911,213 A | | 6/1999 | Ahlborn et al. ............. 123/572 |
| 5,937,837 A | * | 8/1999 | Shaffer et al. .............. 123/573 |
| 6,390,080 B1 | * | 5/2002 | Dowding et al. ........... 123/572 |
| 6,418,917 B1 | * | 7/2002 | Bistue ......................... 123/572 |

* cited by examiner

Primary Examiner—Marguerite McMahon
(74) Attorney, Agent, or Firm—Todd T Taylor

(57) ABSTRACT

A method and apparatus for the treatment of blow-by gas from a crankcase of an internal combustion engine. A particle and droplet filter removes at least some of any particles or droplets in the gaseous stream. The filtered gaseous stream is passed through a primary heat exchanger, and a catalyzed soot filter downstream of the primary heat exchanger. A secondary heat exchanger may be used to heat the gaseous stream with exhaust gas from the internal combustion engine. Blow-by gases are cleaned for subsequent discharge to the ambient environment, or for reintroduction to the fuel system of the engine.

20 Claims, 1 Drawing Sheet

CRANKCASE BLOW-BY FILTRATION SYSTEM

TECHNICAL FIELD

The present invention relates generally to internal combustion engines, and, more particularly, to a method and apparatus for treating blow-by gases found in the crankcase of an internal combustion engine.

BACKGROUND

In internal combustion engines, including diesel and gasoline engines, a fuel and air mixture is combusted in combustion cylinders. A reciprocating piston in the combustion cylinder moves between top dead center and bottom dead center positions, compressing the fuel and air mixture as the cylinder moves towards the top dead center position and capturing energy released during combustion as the piston moves toward the bottom dead center position.

Combustion in the cylinder releases energy and generates combustion products and by-products, most of which are exhausted from the cylinder to an exhaust system of the engine during the exhaust phase of the combustion cycle. However, some of the combustion products enter into the engine crankcase during operation of the engine. Gases entering the crankcase are referred to as "blow-by" gases, in that the gases enter the crankcase as a result of having been blown by piston rings, valve guides of the engine and the like. Blow-by gases in the crankcase contain components deemed environmentally harmful, such as combustion by-products, including hydrocarbons and carbon monoxide, as well as oil mist produced in the crankcase and some water vapors. It is necessary to relieve the build-up of blow-by gases in the crankcase.

It is known in a naturally aspirated engine to discharge the blow-by gases from the crankcase to the intake manifold of the engine, for subsequent oxidation of the blow-by gases in the combustion process in the combustion cylinders. It is also known to simply discharge crankcase blow-by gases to the ambient environment, generally through a breather that separates at least a portion of any fluid droplets and/or particulate matter contained in the blow-by gases. Crankcase breathers typically have low filtration efficiency, thus allowing much of the unburned hydrocarbons, oil and fuel mist or soot particles to pass through the breather and be discharged into the ambient environment. Carbon monoxide contained in the blow-by gases will pass through a crankcase breather unabated.

In a pollution conscious society, contaminants contained in blow-by gases discharged to the environment cannot be ignored. Handling blow-by gases in a turbocharged engine provides unique difficulties, since returning the blow-by gases from the crankcase to the intake manifold requires use of an EGR pump, which is not yet commercially available. Returning blow-by gases to the intake side of a compressor in the turbocharger can result in fouling of the compressor wheel in a relatively short time period, thus causing loss of efficiency and subsequent turbocharger failure. The untreated blow-by gases also foul the aftercooler, causing loss of aftercooler effectiveness. This will lead to an increase in engine operating temperature, and cause the engine to fail.

U.S. Pat. No. 5,803,025 entitled "Blow-by Disposable System" describes a system in which blow-by gases from the crankcase are transported to an air-oil separator and to a pump. The pump transports the stream of contaminants into the exhaust system of the engine, where it becomes a portion of the overall exhaust emission stream.

The present invention is directed to overcoming one or more of the problems as set forth above.

SUMMARY OF THE INVENTION

In one aspect thereof, the present invention provides a blow-by filtration system for a crankcase of an internal combustion engine. A fluid conduit receives blow-by gases from the crankcase. A particle and droplet filter is disposed in the conduit, the filter adapted for removal of droplets and particles from a stream of blow-by gases flowing through the conduit. A catalyzed soot filter has an inlet receiving gases from the particle and droplet filter, and a primary heat exchanger is disposed in fluid flow communication between the particle and droplet filter and the catalyzed soot filter.

In another aspect thereof, the invention provides an internal combustion engine with a plurality of combustion cylinders, an intake manifold connected to the plurality of combustion cylinders, and an exhaust manifold connected to the plurality of combustion cylinders. A crankcase is associated with the plurality of combustion cylinders. A fluid conduit receives gaseous fluid flow from the crankcase. A particle and droplet filter is disposed in the fluid conduit. A primary heat exchanger is disposed in the conduit and has an inlet and an outlet, the primary heat exchanger inlet connected to receive fluid flow from the particle and droplet filter outlet. A catalyzed soot filter has an inlet and an outlet, the catalyzed soot filter inlet connected to receive fluid flow from the primary heat exchanger outlet.

In a further aspect thereof, the invention provides a method for treating blow-by gas in a crankcase of an internal combustion engine, with steps of filtering out at least some of any liquid droplet and particulate matter contained in the blow-by gases; passing the filtered blow-by gas through a primary heat exchanger; and passing the filtered blow-by gas from the primary heat exchanger through a catalyzed soot filter.

DETAILED DESCRIPTION

Figure 1:
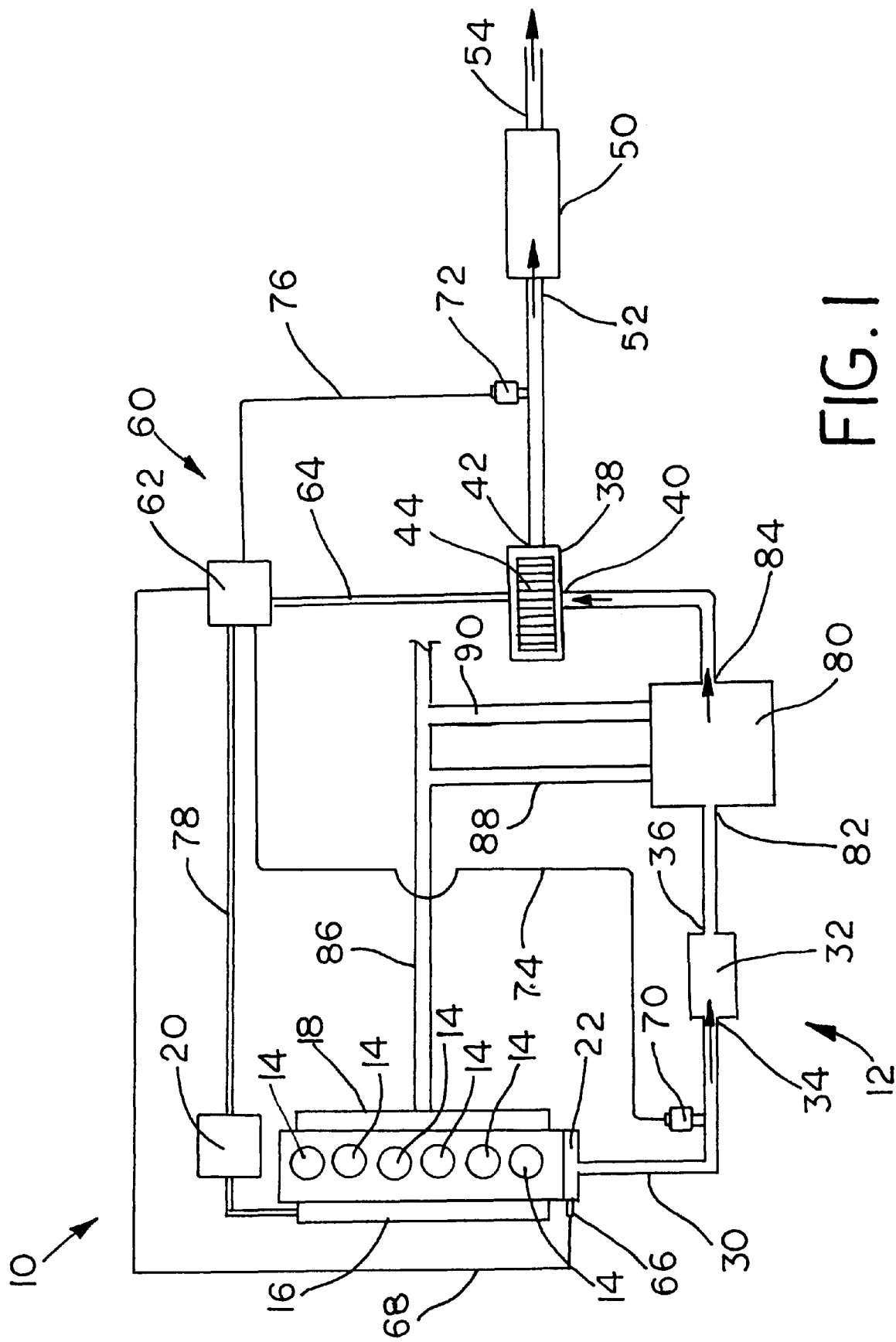
FIG. 1 is a schematic illustration of an internal combustion engine having a crankcase blow-by filtration system of the present invention.

Referring now to the drawing, FIG. 1 illustrates an internal combustion engine 10 having a crankcase blow-by filtration system 12 in accordance with the present invention.

Internal combustion engine 10 includes a plurality of combustion cylinders 14, and as shown in FIG. 1, includes six combustion cylinders 14, although more or fewer combustion cylinders 14 can be provided. Each combustion cylinder 14 is coupled with an intake manifold 16 and with an exhaust manifold 18. While a single intake manifold 16 is shown, it should be understood that more than one intake manifold 16 may be used with each intake manifold 16 coupled to a plurality of combustion cylinders 14, for providing an air mixture to each combustion cylinder 14. Further, while a single exhaust manifold 18 is shown, it should be understood that more than one exhaust manifold 18 may be provided, with each exhaust manifold 18 coupled to a different plurality of combustion cylinders 14.

A fuel, such as diesel fuel, is injected into each combustion cylinder 14 and combusted therein in a known manner. A fuel system 20 is schematically illustrated in FIG. 1, and includes a supply and appropriate metering system for fuel, such as gasoline, natural gas or diesel fuel, as well as a supply and metering system for combustion air. It should be understood that fuel system 20 may include one or more turbochargers for increasing the combustion air flow to intake manifold 16.

Engine 10 further includes a crankcase 22 associated with combustion cylinders 14. Blow-by gases from combustion cylinders 14 enter crankcase 22 by seeping past piston rings, seals and the like, and, unless relieved, accumulate in crankcase 22.

Crankcase blow-by filtration system 12 includes a conduit 30 receiving primarily a gaseous fluid flow from crankcase 22. Disposed within conduit 30 is a particle and droplet filter 32 having an inlet 34 and an outlet 36, with inlet 34 receiving fluid flow from crankcase 22. Further disposed along conduit 30 is a primary heat exchanger 38 having an inlet 40 connected in flow communication to receive fluid flow from outlet 36 of particle and droplet filter 32. Primary heat exchanger 38 further includes an outlet 42. In a preferred embodiment for primary heat exchanger 38, an electrical heating element 44 is provided as a source of heat for a fluid stream passing through conduit 30.

Still further along conduit 30, a soot filter 50 is provided. Soot filter 50 includes an inlet connected in flow communication for receiving a fluid stream from outlet 42 of primary heat exchanger 38. An outlet 54 of soot filter 50 may be connected to discharge a fluid stream to the ambient environment or, alternatively, outlet 54 may be connected to discharge the fluid stream from conduit 30 into fuel system 20, and particularly any turbocharger (not shown) included in fuel system 20. Advantageously, soot filter 50 is a catalyzed soot filter, having a coating of an oxidation catalyst on the filter surfaces thereof. Alternatively, soot filter 50 can be a noncatalyzed soot filter with means to facilitate regeneration.

A control system 60 is provided in crankcase blow-by filtration system 12 and includes a controller 62. Controller 62 is connected by a signal line 64 to primary heat exchanger 38, for controlling operation of electrical heating element 44. Controller 62 receives input data from one or more engine or system sensors, including a pressure sensor 66 provided in crankcase 22 and connected to controller 62 by a data line 68. Further, temperature sensors 70 and 72 may be used upstream of particle and droplet filter 32 and downstream of primary heat exchanger 38, respectively. Temperature sensor 70 and 72 are connected to controller 62 by data lines 74 and 76, respectively. Data regarding the operation of fuel system 20, including the quantity of fuel used therein, may be provided to controller 62 by one or more data lines 78.

To decrease the use of electrical energy by electrical heating element 44 in primary heat exchanger 38, a secondary heat exchanger 80 is provided. Secondary heat exchanger 80 includes an inlet 82 connected to receive fluid flow from outlet 36 of particle and droplet filter 32. Secondary heat exchanger 80further includes an outlet 84 connected in flow communication to provide fluid flow to inlet 40 of primary heat exchanger 38. As a source of heat exchange fluid in secondary heat exchanger 80, an exhaust line 86 from exhaust manifold 18 is connected to secondary heat exchanger 80 by exhaust fluid supply and return lines 88 and 90. In secondary heat exchanger 80, exhaust from exhaust manifold 18 is passed in heat exchange relationship with blow-by gas fluid flow in conduit 30.

INDUSTRIAL APPLICABILITY

During use of engine 10, a fuel, such as diesel fuel, is injected into combustion cylinders 14 and combusted when a piston (not shown) disposed within each combustion cylinder 14 is at or near a top dead center position. The combustion air and fuel mixture is provided to intake manifold 16 by fuel system 20. Exhaust gas from each cylinder 14 is transported to exhaust manifold 18. A portion of the gases contained in cylinders 14, which may include combustion by-products, partially combusted gases and the like, inevitably leaks past piston rings (not shown), as well as various seals (not shown) and enters crankcase 22. The build-up of such "blow-by" gases in crankcase 22 is processed through crankcase blow-by filtration system 12.

Initially, blow-by gases are processed through particle and droplet filter 32, which is a course breather type filter removing large oil or fuel droplets, as well as course particulate matter which may be contained in the fluid stream. The thus filtered blow-by gases are passed to primary heat exchanger 38, in which electrical heating element 40 boost the temperature of the fluid stream if required. In a system utilizing optional secondary heat exchanger 80, before entering primary heat exchanger 38, the fluid stream passes in heat exchange relationship with exhaust gas from exhaust manifold 18. The use of secondary heat exchanger 80 reduces the need for heating in primary heat exchanger 38, thus reducing the use of electrical energy by electrical heating element 44.

From primary heat exchanger 38, the fluid stream enters soot filter 50. If provided as a catalyzed soot filter, soot filter 50 consists of a filter medium coated with an oxidation catalyst material. A known catalyzed filter suitable for catalyzed soot filter 50 is a catalyst coated ceramic wall-flow filter. Soot and oil or fuel particles remaining in the fluid stream entering catalyzed soot filter 50 are collected on the filter surfaces, where the oxidation catalyst oxidizes gaseous carbon monoxide and unburned hydrocarbons. The efficiency of the treatment of carbon monoxide and hydrocarbons in catalyzed soot filter 50 is dependent on the catalyst temperature, the size of the catalyst and the formulation of the catalyst. As compared to a noncatalyzed soot filter, a catalyzed soot filter 50 will have a lower filter regeneration temperature and will function to reduce unburned hydrocarbon and carbon monoxide levels. When the catalyst temperature is above the "regeneration" temperature, soot collected on the filter surfaces will be oxidized into carbon dioxide, thus cleaning the filter. Since the catalyzed filter is very efficient in removing soot particles, unburned fuel and lube oil from the gaseous stream, the blow-by gas can be discharged into the atmosphere after processing through catalyzed soot filter 50. Alternatively, the blow-by gas discharged from catalyzed soot filter 50 can be directed to fuel system 20, including any turbocharger compressor included therein, without deleterious effect on fuel system 20.

Operation of electrical heating element 44 is controlled by control system 60. A variety of regeneration strategies can be used. For example, in one such strategy, regeneration can be instituted based on the amount of fuel burned in engine 10, with fuel consumption data being provided to controller 62 from fuel system 20. Utilizing such a feedback system, the various temperature and/or pressure sensors are not required. Alternatively, temperature sensors can be eliminated using the pressure-sensor providing data from crankcase 22 for determining regeneration requirements.

The crankcase blow-by filtration system of the present invention provides efficient removal of particulate matters and high removal efficiency of unburned hydrocarbons and carbon monoxide. Utilizing the system of the present invention, blow-by gases can be returned to a compressor inlet of a turbocharger without compressor and aftercooler fouling problems. Controls provide reliable regeneration of the catalyzed soot filter, thereby preventing clogging of the filter.

Other aspects, objects and advantages of this invention can be obtained from a study of the drawings, the disclosure and the appended claims.

What is claimed is:

1. A blow-by filtration system for a crankcase of an internal combustion engine, comprising:

a fluid conduit receiving blow-by gases from the crankcase;

a particle and droplet filter disposed in said conduit, said filter adapted for removal of droplets and particles from a stream of blow-by gases flowing through said conduit, said filter having an outlet;

a soot filter having an inlet receiving gases from said particle and droplet filter; and a primary heat exchanger disposed in fluid flow communication between said particle and droplet filter and said catalyzed soot filter.

2. The filtration system of claim 1, said primary heat exchanger including an electrical heating element.

3. The filtration system of claim 2, including a secondary heat exchanger disposed in fluid flow communication between said particle and droplet filter and said primary heat exchanger.

4. The filtration system of claim 3, said secondary heat exchanger connected to a source of high temperature fluid.

5. The filtration system of claim 1, including a controller connected to said primary heat exchanger, and at least one system sensor providing system performance data to said controller.

6. The filtration system of claim 5, said at least one system sensor including a temperature sensor.

7. The filtration system of claim 5, said at least one system sensor including a pressure sensor in the crankcase.

8. The filtration system of claim 1, said soot filter including an oxidation catalyst.

9. An internal combustion engine, comprising:

a plurality of combustion cylinders;

an intake manifold connected to said plurality of combustion cylinders;

an exhaust manifold connected to said plurality of combustion cylinders;

a crankcase associated with said plurality of combustion cylinders;

a fluid conduit receiving gaseous fluid flow from said crankcase;

a particle and droplet filter disposed in said fluid conduit and having an inlet and an outlet;

a primary heat exchanger disposed in said conduit and having an inlet and an outlet, said primary heat exchanger inlet connected to receive fluid flow from said particle and droplet filter outlet; and a catalyzed soot filter having an inlet and an outlet, said catalyzed soot filter inlet connected to receive fluid flow from said primary heat exchanger outlet.

10. The internal combustion engine of claim 9, including a secondary heat exchanger disposed in fluid flow communication between said particle and droplet filter and said primary heat exchanger.

11. The internal combustion engine of claim 10, said secondary heat exchanger connected to receive an exhaust gas flow from said exhaust manifold, and to pass said exhaust gas flow in heat exchange relationship with said gaseous fluid flow from said crankcase.

12. The internal combustion engine of claim 9, including a controller connected to said primary heat exchanger for controlling the operation of said primary heat exchanger, and at least on engine sensor providing engine condition data to said controller.

13. The internal combustion engine of claim 12, said at least one engine sensor including a temperature sensor up stream of said particle and droplet filter.

14. The internal combustion engine of claim 12, said at least one engine sensor including a pressure sensor in said crankcase.

15. The internal combustion engine of claim 12, said at least one engine sensor including a temperature sensor between said primary heat exchanger outlet and said catalyzed soot filter.

16. The internal combustion engine of claim 9, said catalyzed soot filter outlet connected to said intake manifold.

17. The internal combustion engine of claim 9, said catalyzed soot filter outlet connected to an ambient environment.

18. A method for treating blow-by gas in a crankcase of an internal combustion engine, comprising steps of:

filtering out at least some of any liquid droplet and particulate matter contained in the blow-by gases;

passing the filtered blow-by gas through a primary heat exchanger; and passing the filtered blow-by gas from the primary heat exchanger through a catalyzed soot filter.

19. The method of claim 18, including passing said filtered blow-by gas in heat exchange relationship with exhaust gas in a secondary heat exchanger upstream of the primary heat exchanger.

20. The method of claim 18, including heating the blow-by gas in the primary heat exchanger, only in response to a need for increased temperature in the catalyzed soot filter.

* * * * *